Figure 5:
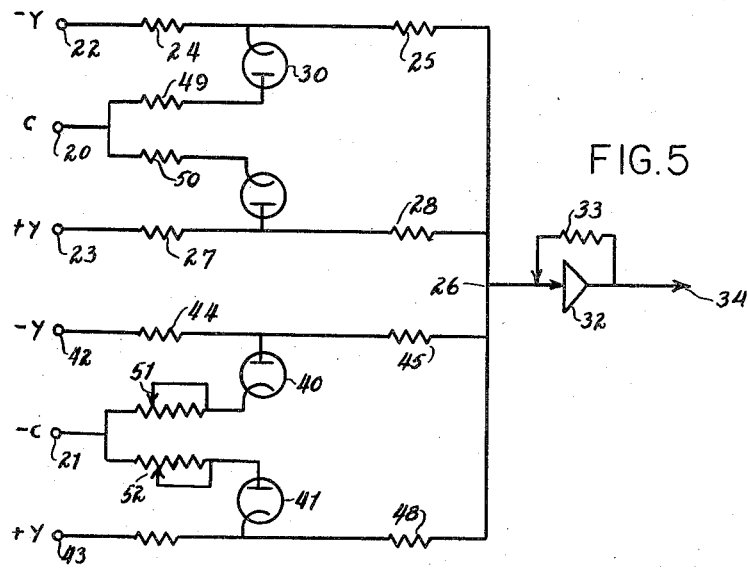

July 8, 1958  J. E. MARTIN  2,842,664
ELECTRONIC SWITCHES
Filed March 23, 1956  2 Sheets-Sheet 1
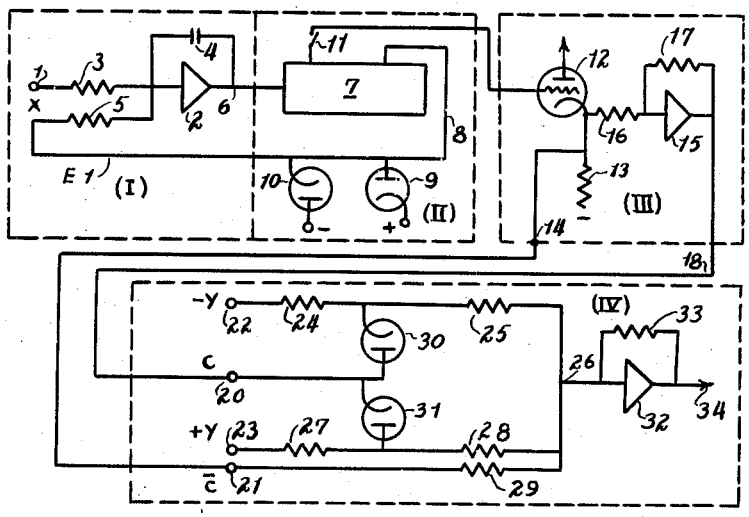
FIG. I
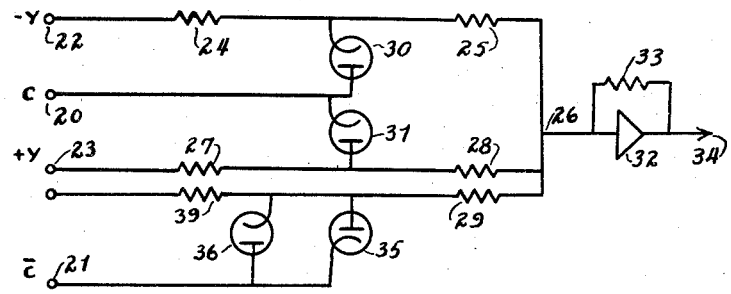
FIG. 2
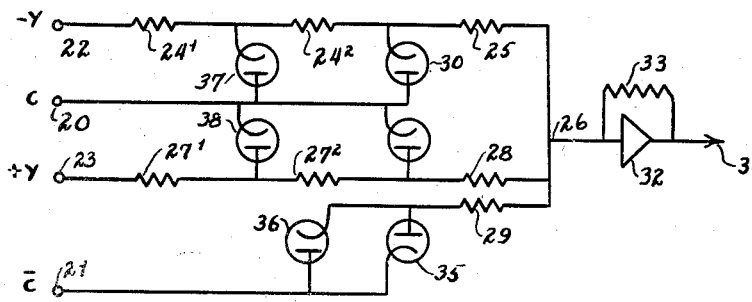
FIG. 3
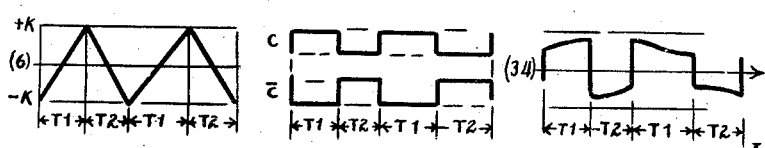
FIG. 4
INVENTOR.
JACQUES EDOUARD MARTIN
BY
ATTORNEY July 8, 1958  J. E. MARTIN  2,842,664
ELECTRONIC SWITCHES
Filed March 23, 1956 2 Sheets-Sheet 2

INVENTOR.
JACQUES EDOUARD MARTIN
BY
ATTORNEY

United States Patent Office 2,842,664
Patented July 8, 1958

2,842,664

ELECTRONIC SWITCHES

Jacques Edouard Martin, Paris, France, assignor to Societe d'Electronique et d'Automatisme, Courbevoie, Seine, France Application March 23, 1956, Serial No. 573,356

Claims priority, application France April 7, 1955

8 Claims. (Cl. 250—27)

The present invention relates to an electronic switch of the kind wherein the one or the other of a pair of input signal voltages, one of which at least varies with the time, is selectively transmitted to an output channel under the control of the variation of a two-level control signal from its higher value to its lower one and conversely. Hereinbelow this kind of switch will be called a switch of the kind specified.

The primary object of the invention is to provide a switch of the kind specified which, though being of simple design, ensures a great reliability to the switching process thereof and may further ensure a great accuracy of this process in that it does not introduce any substantial distortion, or at least any distortion which cannot be easily compensated, in the transmission therethrough of the one or the other of its input signals to its output channel.

Another object of the invention is to provide such a switch of the kind specified which is particularly adapted to enter as a component in such analog computers as the so-called time-division multipliers and the like.

Briefly stated, an electronic switch according to the invention includes in combination with a summing amplifier the output of which constitutes the said output channel, at least a pair of series resistance attenuators to the input ends of which are respectively applied the said input signal voltages and the output ends of which are connected to the input of the said summing amplifier, means for so controlling the transmission through the said attenuators from the said control signal that according to the condition of the said control signal one of the said attenuators applies its signal voltage to the said input of the summing amplifier whereas the other one of the said attenuators applies the control signal to the said input of the summing amplifier, and means for also applying to the said input of the summing amplifier a further signal always substantially cancelling the said control signal applied thereto from the one of the other of the said input signal transmitting attenuators.

According to the invention further, the said means for controlling the transmission conditions of the said attenuators includes a pair of oppositely connected unidirectionally conducting circuits, respectively branched off homologous intermediary points of the said attenuators and supplied with the said control signal voltage, whereas the said means for applying the said cancellation signal to the input of the summing amplifier includes at least a further attenuator supplied with or controlled from a signal waveform complementary to that of the said control signal.

Figure 6:
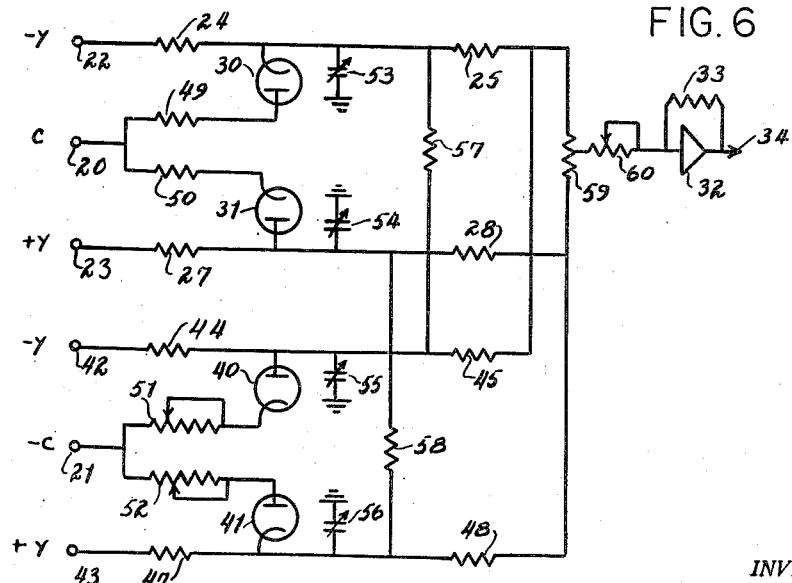

These and further features of the invention will be described in more details with reference to the accompanying drawings, wherein:

Fig. 1 shows the circuit diagram of a time-division analog multiplier which includes an electronic switch according to the invention, Fig. 2 shows a first improvement to the electronic switch of Fig. 1, Fig. 3 shows another improvement to the switch of Fig. 2, Fig. 4 shows certain graphs for use in relation with the device of Fig. 1, Figs. 5 and 6 show another improvement to the electronic switch of Fig. 1.

The time-division multiplier of Fig. 1 is shown as giving a fair example of the use of an electronic switch according to the invention. This device may be considered as comprising four associated units, viz.

Unit (I)—an integrating circuit,
Unit (II)—an integration control circuit,
Unit (III)—a switching control signal forming unit,
Unit (IV)—an electronic switch according to the invention.

The first unit (I) receives at 1 an input signal voltage X which is applied through a series resistor 3 to the input of a high gain amplifier 2. This amplifier is provided with a negative feedback loop comprising a condenser 4. It is now well-known that such a circuit acts as an electronic integrator in that its output signal, at 6, represents the value of the time integral of the input signal at 1. The integration time-constant is R.C wherein R is the value of the resistor 3 and C, the value of the condenser 4.

In this case, however, another voltage is added to the input signal X, at the input of the amplifier 2. This voltage is applied through the resistor 5 and is a reference voltage which has to be alternately positive and negative according to a control which will be hereinbelow described. This reference voltage may be denoted E, and the second unit (II) controls the changes of the said voltage from the value $+E$ to the value $-E$ and vice-versa.

The said unit (II) mainly includes an electronic circuit of the flip-flop kind, 7, the output voltage of which from the lead 8 unblocks either a diode 9 which then applies the voltage $+E$ to the resistor 5 or a diode 10 which then applies the voltage $-E$ to the same resistor, according to whether the voltage of this output 8 is at its higher or lower value. The state of the flip-flop circuit is controlled from the vary output voltage at 6 of the integrator circuit and consequently changes each time the said integration voltage reaches a predetermined value, $+K$ or $-K$. Such values are alternately obtained from the operation of the integrator circuit according to the control of the said unit (II) applied to the said unit (I) as above described.

If the input signal at 1 was zero, the output voltage of the integrator circuit would follow a law which, plotted with respect to the time, would be represented by a symmetrical saw-tooth, see the left-hand graph of Fig. 4. The change of the signal X with respect to the time renders this saw-tooth asymmetrical through a modification of the slopes of its ascending and descending edges. This is shown in the graph (6) of Fig. 4 and, obviously, the rapidity of such a change is enhanced in this graph for a clear understanding of this phenomenon.

The value of resistor 3 is twice the value of resistor 5. Consequently, alternations are obtained for the time durations of the rises and falls of the saw-toothed voltage (6) which may be termed as follows:

(i)    $T1 = RC/(E+\tfrac{1}{2}X)$
       $T2 = RC/(E-\tfrac{1}{2}X)$ and the average value of the signal voltage during each saw-toothed period is:

(ii)    $(T1-T2)/(T1+T2) = \tfrac{1}{2}X/E$

An accuracy of the order of $10^{-3}$ will be obtained when the reference voltage E will be accurate within a definition of $0.5 \times 10^{-3}$ of the value taken as unity, that is to say E. With respect to E, the voltage values —K and +K may be arbitrarily chosen provided these values are maintained constant during a complete period of the saw-toothed voltage.

The third unit (III) is adapted to deliver the control signal voltage for the electronic switch constituting the fourth unit, and this third unit is controlled from the other output 11 of the flip-flop circuit 7. According to the voltage value of this output 11, a cathode-follower stage 12 is conducting or not. The output lead 14 of this cathode-follower will in correspondence deliver either the high supply voltage of the plate of tube 12 or the low bias voltage applied to the cathode resistor 13. The signal C on this output lead 14 will then follow a rectangular wave-form such as shown at (34) in Fig. 4. The tops and bottoms of the said rectangular wave-form will have time durations T1 and T2 such as hereinabove defined, i. e. depending from the variation of the signal X with respect to the time. The average value of C will be proportional to the variable X and the coefficient of proportionality will be ½ in the concerned case, as explained above.

The signal voltage C is also applied to a phase-inverter circuit (overall gain —1) including, as well-known, a high gain amplifier 15 provided with a negative feedback resistor 17 and receiving its input signal through a series resistor 16 of the same high value as 17. From this inverter circuit is obtained upon the lead 18 a signal wave-form $\bar{C}$, which is at any time complementary to the wave-form C, as clearly shown by the corresponding graph of Fig. 4.

The fourth unit is constituted by an electronic switch according to the invention, which is controlled from the third. It includes a summing amplifier, comprising a high gain amplifier 32 provided with a negative feedback resistor 33 and with three input resistors 25, 28 and 29 of the same value and each intended to receive a separate input signal. For a reason which will be later explained, each one of the resistors 25, 28 and 29 has a value equal to one quarter of the value of 33. The value of 33 will be assumed to be 2R, for the present time. The output 34 of the amplifier 32 constituted the output channel of the whole device and this channel will bear a voltage proportional to the product X.Y.

The signal voltage Y is applied to the terminals 22 and 23 in the one and the other of its complementary wave-form. For the sake of clearance, the voltage applied to the terminal 22 will be said to be —Y and the voltage applied to the terminal 23 will be said to be +Y, but these denominations do not imply an actual correspondence of the terminals and definite polarities of the signals applied thereto.

The terminal 22 is connected by a resistor 24 to the above-mentioned resistor 25. The value of 24 is equal to the value of 25 and these resistors constitute together a first attenuator in the switch. Samely, a resistor 27 is inserted between the terminal 23 and the resistor 28, 27 being of the same value as 28, and together, they constitute the second attenuator in the switch. In Fig. 1, the third attenuator only comprises the resistor 29.

From the point intermediate between the resistors 24—25 is branched off the cathode of a diode 30. From the point intermediate between the resistors 27—28 is branched off the anode of a diode 31. The anode of 30 and the cathode of 31 are both connected to the terminal 20 connected to the lead 14 and consequently receiving the control signal C.

The complementary voltage $\bar{C}$ is applied from the lead 18 to the terminal 21 of the third attenuator 29.

During each time interval T1, the voltage waveform C is at its higher value and the complementary waveform $\bar{C}$ is at its lower value. From the design, C always equals —$\bar{C}$. Diode 30 is conducting, diode 31 is not, due to the relative value of Y and —Y.

The input 26 of the summing amplifier receives the three following currents: $I_1$ from the attenuator 24—25, $I_2$ from the attenuator 27—28 and $I_3$ from the attenuator 29. During each time interval T1, the overall current at 26 is:

(iii) $\quad I_{T1} = 2C/R + Y/R + 2\bar{C}/R = +Y/R$

During each time interval T2, the diode 30 is nonconducting and the diode 31 is conducting, since the higher and lower voltage values are reversed in C and $\bar{C}$. The current at 26 becomes:

(iv) $\quad I_{T2} = -Y/R + 2C/R + 2\bar{C}/R = -Y/R$

The mean or average value of the overall current I is consequently given by the relation:

(v) $\quad I[T1.Y/R + T2.(-Y/R)]/(T1+T2)$ and consequently by:

(vi) $\quad I = (Y/R).(T1-T2)/T1+T2$

As, according to the relation (ii), the last part of this relation (vi) is equal to ½X, finally, the overall average current I is equal to:

(vii) $\quad I = \frac{1}{2} X.Y/R$

The feedback resistor 33 being equal to 2R, as said, the output voltage at 34 thus represents a signal proportional to the product of the two analog variables X and Y.

The waveform of the said output signal is shown at (34) in Fig. 4, right-hand graph thereof.

(viii) $\quad U_{34} = X.Y$ in the average value thereof.

In the circuit diagram of the switch shown in Fig. 1, the accuracy depends upon the ratio established between the value of the resistance R and the value of the internal resistance r of a diode. The above-defined relations do not take this internal resistance into consideration. But from a practical point of view, R must not be taken of too high a value. It results therefrom that the ratio R/r may be chosen from 300 to 500 for instance and must be considered for the design of the switch.

Considering now the said internal resistance r and introducing this value in the above relations, it is clear that during each time interval T1, the components $I_2$ and $I_3$ remain unchanged:

(ix) $\quad I_2 = +Y/R$ and $I_3 = 2\bar{C}/R$ but the component $I_1$ becomes:

(x) $\quad I_1 = 2C/(R+4r) - 4r.Y/[R(R+4r)]$

This current component $I_1$ is due in part to the voltage C applied through the resistance r of the diode and both the R/2 resistances through 24 to the terminal 22 and through 25 to the point 26, and in part to the voltage —Y applied through an R/2 resistance to the terminal 20 through r and to 26 through R/2.

Then, during any time interval T1, the current $I_{T1}$ is:

(xi) $\quad I_{T1} = Y/R - 8r.C/[R(R+4r)] - 4r.Y/[R(R+4r)]$

In a similar manner, during a time interval T2, the current components $I_1$ and $I_3$ remain unchanged:

(xii) $\quad I_1 = -Y/R$ and $I_3 = 2\bar{C}/R$ but the component $I_2$ becomes:

(xiii) $\quad I_2 = 2C/(R+4r) + 4r.Y/[R(R+4r)]$ and the current $I_{T2}$ then becomes:

(xiv) $\quad I_{T2} = -Y/R - 8r.C/[R(R+4r)] + 4r.Y/[R(R+4r)]$

The mean value of the overall current at 26 will then be expressed by:

(xv) $\quad I=(T1.I_{T1}+T2.I_{T2})/(T1+T2)$ and, as the values of C and $\overline{C}$ are interchanged from a time interval T1 to a time interval T2, this value will be:

(xvi) $\quad I=\dfrac{T1-T2}{T1+T2}\cdot(Y/R-8r.C/[R(R+4r)]-4r.Y/[R(R+4r)])$ and consequently, (xvii) $\quad I=\tfrac{1}{2}X.(Y/R-(C/R).(8r/R+4r)-(Y/R).(4r/R+4r))$ When the feedback resistor is taken of a value 2R, the output signal from the electronic switch is:

(xviii) $\quad U_{34}=X.Y-X.C.8r/(R+4r)-X.Y.4r/(R+4r)$

In this output there exists two distortive components. The X.Y component can be eliminated through a suitable adjustment of the amplifier gain, the X.C component would necessitate for suitable compensation a reintroduction in this output of a suitably controlled part of the variable voltage X.

Such a reintroduction may be avoided when, according to Fig. 2, the circuit diagram of the switch is provided with a pair of diodes 35 and 36 of reverse directions of connection, inserted each between the terminal 21 and the resistor 29. The third attenuator further is completed in that it includes a resistor 39 connected to 29 at one end and having its other end to the ground. The resistor 39 is made equal to R/2 and so is the resistor 29.

In such a scheme, the current component $I_3$ as well during a time interval T1 as in a time interval T2 becomes:

(xix) $\quad I_3=2\overline{C}/(R+4r)$ so that (xx) $\quad I_{T1}=Y/R-Y.4r/[R(R+4r)]$ and (xxi) $\quad I_{T2}=-Y/R+Y.4r/[R(R+4r)]$ and the average current I becomes:

(xxii) $\quad I=\tfrac{1}{2}X.[Y/R-(Y/R).(4r/R+4r)]$ and the output signal at 34 then becomes:

(xxiii) $\quad U_{34}=X.Y-X.Y.4r/(R+4r)$

The component in X.Y.( ) can be eliminated through a mere adjustment of the gain of the amplifier 32. When considering a ratio $R/r$ equal to 300, the compensation will be obtained by an increase of about 1/75 of the gain of the amplifier 32; when considering this ratio equal to 500, the said increase of gain must only be of the order of 1/126.

Another way of increasing the accuracy of the switch may further be obtained from the insertion of a pair of supplementary diodes, 37 and 38, Fig. 3, between the terminal 20 and points of the attenuators 24—25 and 27—28 intermediate between their respective terminals 22 and 23 and the connection points of their series resistors. For instance, the resistor 24 is replaced by the two series resistors $24^1$ and $24^2$, each having a value equal to R/4, and the resistor 27 is replaced by the two series resistors $27^1$ and $27^2$, of this same value R/4.

The third attenuator is again reduced to the resistor 29 of a value R/2, but the diodes 36 and 35 are maintained in this branch of the switch.

For the scheme of Fig. 3, the following relations may be written:

During each time interval T1, we have (xxiv) $\quad I_1=C.(24r+2R)/(32r^2+14rR+R^2)-$
$\qquad(Y/R).32r^2/(32r^2+14rR+R^2)$ $\qquad I_2=Y/R$ $\qquad I_3=2\overline{C}/(2r+R)$ and consequently, (xxv) $\quad I_{T1}=Y/R+C.16r^2/[(32r^2+14rR+R^2)$
$\qquad(2r+R)]-(Y/R).32r^2/(32r^2+14rR+R^2)$ And during each time interval T2, we have (xxvi) $\quad I_1=-Y/R$ $\qquad I_2=C.(24r+2R)/(32r^2+14rR+R^2)+$
$\qquad(Y/R).32r^2/(32r^2+14rR+R^2)$ $\qquad I_3=2\overline{C}/(2r+R)$ and consequently, (xxvii)
$I_{T2}=-Y/R+C.16r^2/[(32r^2+14rR+R^2)(2r+R)]$
$\qquad+(Y/R).32r^2/(32r^2+14rR+R^2)$ The average value of the current I will now be:

(xxviii) $\quad I=\tfrac{1}{2}X.\{(Y/R)-C.16r^2/[32r^2+14rR+R^2)$
$\qquad(2r+R)]+(Y/R).32r^2/(32r^2+14rR+R^2)\}$ and the output signal from the electronic switch becomes:

(xxix) $\quad U_{34}=X.Y-X.C.16Rr^2/[(32r^2+14rR+R^2)$
$\qquad(2r+R)]-X.Y.32r^2/(32r^2+14rR+R^2)$ In this output signal the two stray components X.C.( ) and X.Y.( ) are present. The component X.Y could be eliminated as said and the component X. C. could also be eliminated by the provision of such a resistor to the ground as 39 in the third attenuator but of such a value that, for any time interval T1 +T2, the current components $I_3$ and the part X.C. in $I_2$ (for each interval T2) or the part X.C. in $I_1$ (for each interval T1) will substantially balance out their action at 26. In actual practice however, these terms in the relation (xxix) can be considered as quite unimportant. For instance, for a ratio value R/r of the order of magnitude of 300, the unwanted component X.C. is of the order of 1/5,800 and the X.Y unwanted term of the order of 1/2,900, with respect to X.Y. When said ratio is about 500, the unwanted X.C. component falls to an order of 1/16,000 and the unwanted component X. Y. to an order of 1/8,000.

Another fashion of obtaining a high degree of accuracy in an electronic switch according to the invention is, as shown in Figs. 5 and 6, to provide a subdivision of the third attenuator so that the control signal waveform $\overline{C}$ is applied to the switching control of the voltages transmitted through two distinct branches, 44—45 and 47—48, of the said subdivided attenuator. The attenuator branch 44—45 receives for instance the variable voltage —Y from the terminal 42 and the attenuator branch 47—48 similarly receives, from the terminal 43, the variable voltage +Y. The control signal $\overline{C}$ is applied from the terminal 21 to the cathode of a diode 40, the anode of which is connected to the point intermediate between 44 and 45 and to the anode of a diode 41, the cathode of which is connected to the point intermediate between 47 and 48. Each one of the resistors 44, 45, 47, 48 is of the same resistance value, R, and in the main attenuators 24—25 and 27—28, each resistor also is of this value R.

In this scheme further, series resistors are introduced between the control terminal 20 and each one of the diodes 30 and 31, and also between the control terminal 21 and each one of the diodes 40 and 41. Some of these resistors are adjustable at least, for instance the resistors 51 and 52 whereas the resistors 49 and 50 are not adjustable. It may be considered that, from this latter provision, each path from a control terminal to an attenuator, through a series resistor and a diode, is made of a resistance value $r'$.

From the electrical point of view, an arrangement such as the one shown in Fig. 5 is quite symmetrical with respect to the currents during the time intervals T1 and T2.

$I_1$ being the current component issuing from the attenuator 24—25 at point 26, $I_2$ being the current component issuing from the attenuator 27—28, $I_3$, the current component from 44—45 and $I_4$, the current component from 47—48, during a time interval T1, we have (xxx) $\quad I_2+I_4=+Y/R$
$I_1=C/(R+2r')-Y.r'/[R(R+2r')]$
$I_3=-C/(R+2r')-Y.r'/[R(R+2r')]$ The overall current $I_{T1}$ is:

(xxxi) $\quad I_{T1}=+\dfrac{Y}{R}\cdot\left(1-\dfrac{1}{1+\dfrac{R}{2r'}}\right)$ and, from the symmetry of the circuit diagram, the overall current $I_{T2}$ has the same value but with a reversal of the sign:

(xxxii) $\quad I_{T2}=-\dfrac{Y}{R}\cdot\left(1-\dfrac{1}{1+\dfrac{R}{2r'}}\right)$ and the average value of the current I at the point 26 is:

(xxxiii) $\quad I=\dfrac{1}{2}X.Y.\dfrac{1}{R}\cdot\left(1-\dfrac{1}{1+\dfrac{R}{2r'}}\right)$ The output signal on 34 being the product of this current by the resistance value $R_{33}$ of the feedback resistor 33, is given by the relation:

(xxxiv) $\quad U_{34}=\dfrac{1}{2}\dfrac{R_{33}}{R}.X.Y.\left(1-\dfrac{1}{1+\dfrac{R}{2r'}}\right)$ Taking the value of the resistance 33 equal to:

(xxxv) $\quad R_{33}=2R.\left(1-\dfrac{1}{1+\dfrac{R}{2r'}}\right)$ this output voltage $U_{34}$ will be strictly proportional to X.Y.

But in actual practice, the value of $r'$ can only be adjusted in each branch for a definite current value through the concerned branch, as the internal resistance of a diode varies as known with respect to the current flowing through it. Mainly, the internal resistances of the diodes will not vary in the same way for different current thresholds therethrough. As the variable voltage Y must be due to vary between broad limits, such for instance between —100 volts and +100 volts, the current through one of the concerned diodes may also vary between relatively broad limits, and for instance, with $C=85$ v., $R=1$ megohm and $r'=5$ kilohms, the current through a diode may vary between values having a ratio as high as 4, as Y passes from —100 volts to +100 volts or vice-versa. This can produce in the output signal undue variations higher than one-thousand of the complete scale of the said signal.

In order to avoid such a drawback, it is then provided as shown in Fig. 6, a shunt resistor 57 between the outputs of the diodes 30 and 40, and a shunt resistor 58 between the outputs of the diodes 31 and 41.

These resistors do not change the —Y and +Y components of the currents to point 26, but on the other hand they will each pass a current which will depend upon the control voltages C and $\overline{C}$. If these voltages are constant, these currents will be also of a constant value and they add a constant current component through the diodes which reduces therein the action of the variable current component from the +Y and —Y voltages. Such a scheme enables a serious limitation of the above-mentioned drawback and for instance, in the above given example, the limits of variation of the internal resistance of a diode at both ends of the Y scale will be reduced to a ratio of value of 1.2 instead of 4.

Further the provision of the shunt resistances 57 and 58 ensures the obtention of a reduced output impedance from the output of any diode, and consequently, it substantially reduces the unwanted effect of the stray capacities of these diodes (indicated at 53, 54, 55 and 56, respectively for the diodes 30, 31, 40 and 41 in the diagram of Fig. 6).

Preferably, the output arrangement of such an electronic switch is then made as shown in the said Fig. 6: The issuing ends of the attenuators 24—25 and 44—45 are both connected to one end of a balancing potentiometer and the issuing ends of the attenuators 27—28 and 47—48 to the other end of the said potentiometer, the slider of which is connected to the input of the summing amplifier, preferably again through a series adjustable resistor 60.

I claim:

1. In an electronic switching device, a summing amplifier and at least one pair of attenuators having outputs connected to the input of said amplifier, means for applying input signals of substantially opposite polarities to respective inputs of said attenuators, opposite unidirectional circuits connected respectively to intermediate points of said attenuators, means for generating control voltages of complementary waveforms, means for applying at least a component of one of said control voltages to the input ends of both said unidirectional circuit, and means for applying at least a component of the other control voltage to the amplifier input to oppose the component of the control voltage derived through one of said attenuators.

2. In combination, a summing amplifier and at least one pair of series resistance attenuators having outputs connected to the input of said summing amplifier, means for applying distinct input signals of substantially opposite polarities to the inputs of said attenuators, oppositely connected unidirectionally conducting elements having a common input and separate outputs connected respectively to similarly located intermediate points of said attenuators, means for generating a time-modulated square waveform control voltage in complementary waveforms thereof, means for applying to said common input of said unidirectionally conducting elements at least a component of one of said complementary waveforms, and means for applying at least a component of the other complementary waveform to the input of said summing amplifier, opposing thereon the component of said first complementary waveform applied thereon through one of said series resistance attenuators; the other of said series resistance attenuators delivering thereat at least a component of the signal applied to its input.

3. A device according to claim 2 wherein said unidirectional conducting elements are connected respectively to points intermediate between one end of each attenuator connected to its input, and its other end; the other end of said attenuator being connected to the said summing amplifier input.

4. A device according to claim 2 wherein said unidirectional conducting elements are connected respectively to the input end of each attenuator.

5. A device according to claim 2 wherein said unidirectional conducting elements include each a serially connected diode.

6. A device according to claim 2 wherein said unidirectionally conducting elements include each a pair of diodes of the same direction of connection but connected to separate points of their respective attenuators.

7. A device according to claim 2 comprising substantially equal resistances inserted in shunt between the outputs of said unidirectional elements connected to attenuators receiving the same input signal.

8. A device according to claim 7 wherein the output ends of the attenuators receiving the same input signals are connected to the respective ends of a potentiometer resistance having a slider connected to the input of said summing amplifier.

References Cited in the file of this patent

UNITED STATES PATENTS

| | | |
|---|---|---|
| 2,485,642 | Newitt | Oct. 25, 1949 |
| 2,559,173 | Shawhan | July 3, 1951 |
| 2,570,225 | Felker | Oct. 9, 1951 |
| 2,577,015 | Johnson | Dec. 4, 1951 |
| 2,749,440 | Cartwright | June 5, 1956 |